United States Patent
Webster et al.

(10) Patent No.: US 11,716,337 B2
(45) Date of Patent: Aug. 1, 2023

(54) SYSTEMS AND METHODS OF MALWARE DETECTION

(71) Applicant: IronNet Cybersecurity, Inc., Fulton, MD (US)

(72) Inventors: Jordan S. Webster, Vienna, VA (US); Christopher S. Stinson, Odenton, MD (US)

(73) Assignee: IRONNET CYBERSECURITY, INC., McLean, VA (US)

( * ) Notice: Subject to any disclaimer, the term of this patent is extended or adjusted under 35 U.S.C. 154(b) by 423 days.

(21) Appl. No.: 16/786,101

(22) Filed: Feb. 10, 2020

(65) Prior Publication Data
US 2021/0250364 A1    Aug. 12, 2021

(51) Int. Cl.
| | | |
|---|---|---|
| *H04L 9/40* | (2022.01) | |
| *H04L 43/16* | (2022.01) | |
| *H04L 43/022* | (2022.01) | |
| *G06F 17/18* | (2006.01) | |
| *G06F 21/56* | (2013.01) | |

(Continued)

(52) U.S. Cl.
CPC .......... *H04L 63/1416* (2013.01); *G06F 17/18* (2013.01); *G06F 21/566* (2013.01); *G06N 20/00* (2019.01); *H04L 43/022* (2013.01); *H04L 43/16* (2013.01); *H04L 63/1466* (2013.01); *H04L 69/322* (2013.01)

(58) Field of Classification Search
CPC ... H04L 63/1416; H04L 43/022; H04L 43/16; H04L 63/1466; H04L 69/322; G06N 20/00; G06F 17/18; G06F 21/566
See application file for complete search history.

(56) References Cited

U.S. PATENT DOCUMENTS

| | | | | |
|---|---|---|---|---|
| 10,530,671 | B2 * | 1/2020 | Sanders | H04L 69/22 |
| 10,567,247 | B2 * | 2/2020 | Kulshreshtha | H04L 43/10 |
| 10,599,635 | B1 * | 3/2020 | Gunn | G06N 20/00 |

(Continued)

OTHER PUBLICATIONS

Vaibhav Aggarwal, Vaibhav Gupta, Prayag Singh, Kiran Sharma, Neetu Sharma "Detection of Spatial Outlier by Using Improved ZScore Test", Proceedings of the Third International Conference on Trends in Electronics and Informatics (ICOEI 2019) IEEE 788-790 (Year: 2019).*

(Continued)

*Primary Examiner* — Catherine Thiaw
(74) *Attorney, Agent, or Firm* — Fitch, Even, Tabin & Flannery LLP

(57) ABSTRACT

Systems and methods for detecting suspicious malware by analyzing data such as transfer protocol data or logs from a host within an enterprise is provided. The systems and methods include a database for storing current data and historical data obtained from the network and a detection module and an optional display. The embodiments herein extract information from non-encrypted transfer protocol metadata, determine a plurality of features, utilize an outlier detection model that is based on historical behaviors, calculate a suspiciousness score, and create alerts for analysis by users when the score exceeds a threshold. In doing so, the systems and methods of the present invention improve the ability to identify suspicious outliers or potential malware on an iterative basis over time.

16 Claims, 4 Drawing Sheets

(51) Int. Cl.
*H04L 69/322* (2022.01)
*G06N 20/00* (2019.01)

(56) References Cited

U.S. PATENT DOCUMENTS

| | | | | |
|---|---|---|---|---|
| 2005/0125195 | A1* | 6/2005 | Brendel | H04L 63/1425 702/182 |
| 2016/0359889 | A1* | 12/2016 | Yadav | H04L 45/507 |
| 2017/0011297 | A1* | 1/2017 | Li | H02J 13/00002 |
| 2017/0330123 | A1* | 11/2017 | Deshpande | G06Q 30/0206 |
| 2019/0080260 | A1* | 3/2019 | Acuna Agost | G06Q 30/0275 |
| 2019/0132343 | A1* | 5/2019 | Chen | G06N 3/084 |
| 2020/0228567 | A1* | 7/2020 | Kang | H04L 63/1433 |
| 2020/0302074 | A1* | 9/2020 | Little | G06F 21/602 |
| 2021/0112091 | A1* | 4/2021 | Compton | H04L 63/1416 |
| 2021/0303682 | A1* | 9/2021 | Mugambi | H04L 63/1425 |

OTHER PUBLICATIONS

Yang Li and Li Guo: An active learning based tcm-knn algorithm for supervised network intrusion detection. Computers & Security 2007;26:459-467: (Year: 2007).*

36. Rajeswari, A. M., Yalini, S. K., Janani, R., Rajeswari, N., & Deisy, C. A comparative evaluation of supervised and unsupervised methods for detecting outliers. In 2018 Second International Conference on Inventive Communication and Computational Technologies (ICICCT) (pp. 1068-1073). (Year: 2018).*

* cited by examiner

SYSTEMS AND METHODS OF MALWARE DETECTION

FIELD OF THE DISCLOSURE

The present disclosure relates to malware detection in a network. More particularly, the disclosure relates to systems and methods for malware detection by analyzing data from non-encrypted internet transfer protocol logs.

BACKGROUND OF THE DISCLOSURE

Cybercriminals use software called "malware" to compromise and damage network entities and to gain access to private assets and data. Malware is often distributed via an internet transfer protocol, such as HTTP. Malicious actors host malware on servers and then use a variety of methods to trick network users into downloading and opening the files. Detecting such malware downloads helps minimize the damage inflicted by malicious actors.

Conventional systems typically approach malware detection by analyzing file attributes and looking for malicious features. For example, file binaries can be analyzed by machine learning algorithms designed to identify malicious segments of code. Alternatively, file hashes and other file info can be compared to "blacklists" containing known malware. These conventional detection methods have several drawbacks. For instance, analyzing file binaries is computationally expensive because transfer protocol downloads, such as HTTP downloads, can be very large and frequent. Furthermore, hashing methodologies for malware detection have the disadvantage of losing information about the file contents after file records are hashed, and all that remains for analysis is a comparison between the file in question and the list of malicious or "bad hashes." Furthermore, these methods of analyzing file information tend to only expose previously known malware, rather than discovering and learning new potentially malicious files that would assist with future analysis.

BRIEF SUMMARY OF THE DISCLOSURE

The embodiments of the present invention include systems and methods for malware detection. In an embodiment, a system for detecting malware in a network comprises: a database for storing current data and historical data obtained from the network, and a detection module. The detection module may be adapted and configured to perform the steps of: loading the current data from the database; filtering the current data to obtain filtered data based on at least one criterion; saving the filtered data to the database and loading a previously filtered data; determining values of a plurality of features; computing an outlier score for each of the values of the plurality of features; and merging the outlier scores to obtain an output score used to detect malware.

In an embodiment, the at least one criterion is one of a file path information, file name, a content type, a content length, and a file extension type. In another embodiment, the step of computing an outlier score includes performing at least one of a Z-score and a p-value calculation of each of the plurality of features. In an embodiment, the step of merging the outlier scores includes using one of a sum, a weighted average, and a supervised machine learning model algorithm to obtain the output score. In yet another embodiment, the current data and the historical data includes metadata of a transfer protocol. The transfer protocol may be one of HTTP, FTP, SMB, or SMTP or other non-encrypted transfer protocols. In an embodiment, the system further comprises at least one sensor for parsing out the metadata from the current data and the historical data. In an embodiment, the detection module is further adapted and configured to perform the step of creating an alert for each of the output scores at or above a predetermined threshold. In another embodiment, the system further comprises a display for displaying the alert received from the detection module. The plurality of features may include at least one of: a count of a number of times downloads are made from an observed protocol host over a time interval, a count of a number of times an observed transfer protocol path is downloaded over a time interval, an amount by which the value of one feature within the plurality of features is abnormal relative to other file downloads with a same extension as the one feature, and a determination of how strongly a downloaded file name within the current data correlates with a list of known malware file names.

Methods for detecting malware in a network are also provided. In an embodiment, the method comprises the steps of: storing current data and historical data obtained from the network in a database; loading the current data from the database; filtering the current data to obtain filtered data based on at least one criterion; saving the filtered data to the database and loading a previously filtered data; determining values of a plurality of features; computing an outlier score for each of the values of the plurality of features; and merging the outlier scores to obtain an output score used to detect malware. In an embodiment, the at least one criterion is one of a file path information, a file name, a content type, a content length, and a file extension type. In an embodiment, the step of computing an outlier score includes performing at least one of a Z-score and a p-value calculation of each of the plurality of features. In an embodiment, the step of merging the outlier scores includes using one of a sum, a weighted average, and a supervised machine learning model algorithm to obtain the output score. In an embodiment, the current data and the historical data includes metadata of a transfer protocol. The transfer protocol may be one of HTTP, FTP, SMB, and SMTP.

In an embodiment, the method comprises the step of parsing out the metadata from the current data and the historical data using a sensor. In another embodiment, the method further comprises the step of creating an alert for each of the output scores at or above a predetermined threshold. In another embodiment, the method includes displaying the alert in a display. The plurality of features may include at least one of: a count of a number of times downloads are made from an observed protocol host over a time interval, a count of a number of times an observed transfer protocol path is downloaded over a time interval, an amount by which the value of one feature within the plurality of features is abnormal relative to other file downloads with a same extension, and a determination of how strongly a downloaded file name within the current data correlates with a list of known malware file names.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The present disclosure is illustrated and described herein with reference to the various drawings, in which like reference numbers are used to denote like system components, as appropriate, and in which.

DETAILED DESCRIPTION OF THE DISCLOSURE

Embodiments of the invention provide systems and methods for detecting suspicious malware by analyzing data of transfer protocols from a host within an enterprise. Malware as referenced herein includes malware downloads, file records, file transfers, emails, attachments etc. Embodiments of the invention also include devices such as user interfaces for alerting network analysts of suspicious incidents, based on the systems and methods employed herein. The embodiments herein extract information from internet transfer protocols including non-encrypted transfer protocols such as HTTP, FTP, SMB, SMTP, etc. The HTTP protocol is utilized herein as an exemplary internet transfer protocol. However, the systems and methods of the embodiments of the invention herein are not limited to analysis of only HTTP protocol data.

There are many benefits and advantages of the embodiments of the present invention. For example, the embodiments herein perform malware detection in a scalable and inexpensive way, which allows for implementations at a very large scale. Therefore, the embodiments herein are highly beneficial for networks and enterprises with high volumes of traffic, such as HTTP traffic. In addition, the embodiments of the methods of the present invention utilize an outlier detection model that is based on historical behaviors. As such, the embodiments herein "learn" common protocol behaviors that are specific to the network being analyzed. In doing so, the systems and methods of the present invention improve the ability to identify suspicious outliers or potential malware on an iterative basis over time. Additional benefits and advantages of the benefits herein are described below and illustrated with respect to the figures.

System Architecture for Detecting Malware

Figure 1:
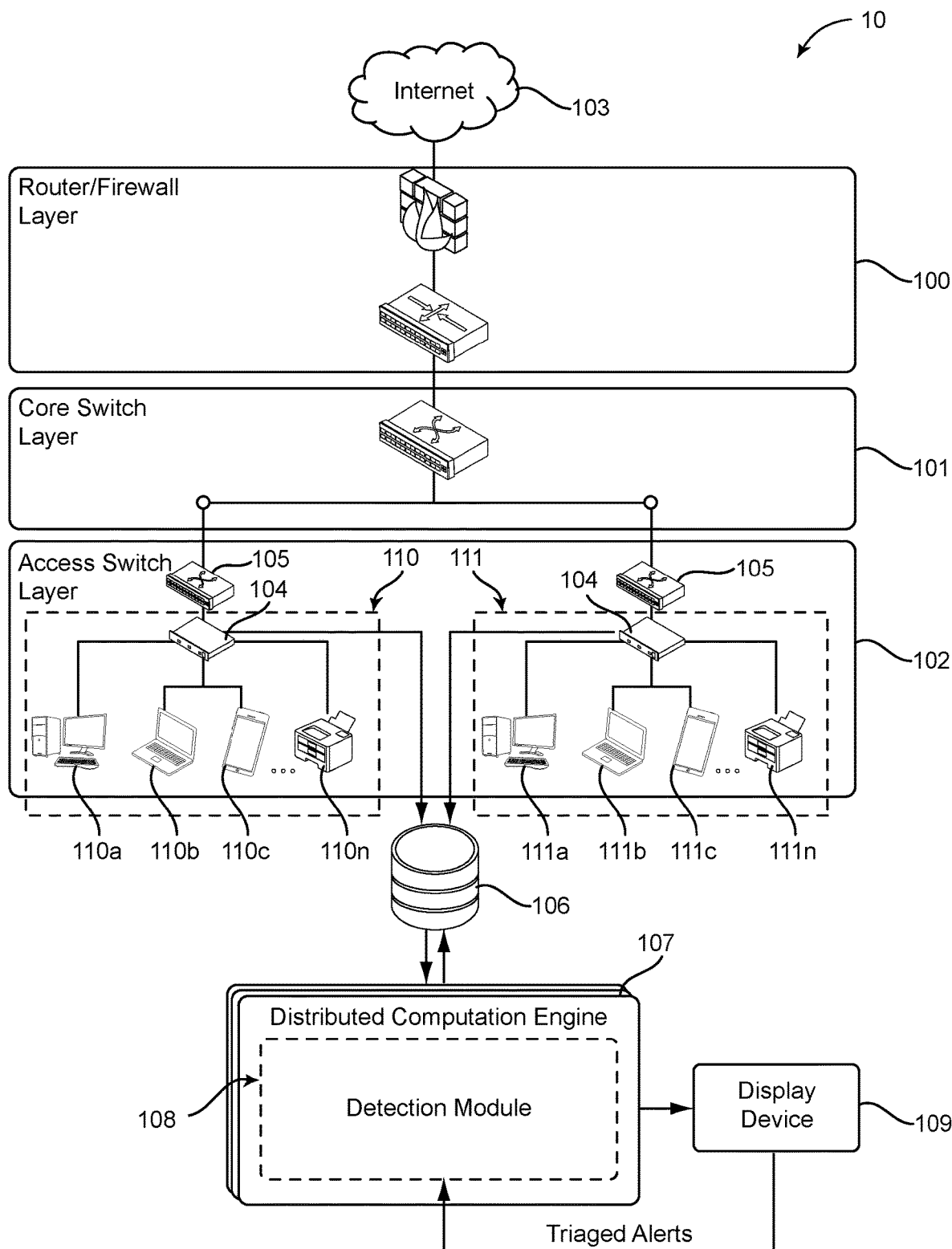
FIG. 1 is a block diagram of a system for detecting malware according to an exemplary embodiment of the present invention.

FIG. 1 illustrates a high-level architecture of an exemplary system 10 for monitoring enterprise network logs of HTTP network traffic so that suspicious malware by enterprise users can be detected and analyzed, according to an embodiment of the present invention. In this embodiment, malware downloads are being detected and analyzed. System 10 includes a plurality of layers 100-103 within a network or enterprise network. The internet 103 is connected to and in communication with the router/firewall layer 100. The router/firewall layer 100 is connected to and in communication with the core switch layer 101. The core switch layer 101 is connected to and in communication with the access switch layer 102. The access switch layer 102 contains one or more enterprise segments 110, 111 having a plurality of connected devices 110a-n, 111a-n (e.g., laptops, PCs, printers, tablets mobile phones etc.). These devices 110a-n, 111a-n are operated by network users, and represent potential targets for malware downloads from the internet 103. A plurality of network traffic sensors 104 are included in each segment 110, 111 within the access switch layer 102.

The sensors 104 serve the purpose of mirroring network traffic or data sent to corresponding access switches 105, parsing out the metadata (e.g., HTTP protocol data), and saving the data to a database 106. The content of the parsed data can vary depending on application specifics and the desires of network analysts. In an embodiment, the data includes at least Path values from HTTP headers. The Path field of the HTTP header represents the string of characters that follows the Host in a URL. An example of an HTTP Path is "/document/d/1VWC/my_song.mp3". The HTTP Path is utilized to determine which records represent file downloads. The data could also contain other fields from HTTP headers, like Host, Content-Length, User-Agent, etc. An example of an HTTP Host is "www.google.com." For HTTP downloads, the Content-Length in the header of the HTTP response typically represents the size of the downloaded file. For HTTP downloads, the User-Agent in the header of the HTTP request typically contains some information about the platform requesting the download (e.g., "Mozilla/5.0"). The sensors 104 can consist of one or more hardware components. Sensors 104 may also include or be comprised entirely of software modules that run on the individual devices 110a-n, 111a-n within the access switch layer 102.

In FIG. 1, sensors 104 are located within each enterprise segment 110,111 of the access switch layer 102. This enables each of the sensors 104 within the enterprise segments 110, 111 to have complete coverage of its respective internal enterprise network traffic. An advantage of this configuration is that having dedicated sensors 104 provides coverage that results in increased detection capabilities. Sensors 104 write the data (e.g., transfer protocol metadata) to the database 106. The database 106 may be either internal or external to the enterprise segment 110,111. After the data is provided to the database 106, it is loaded by the computation engine 107. The computation engine 107 may be a distributed computation engine that has multiple processors (not shown), capable of running a cluster computing framework (e.g., Apache Spark) that allows data to be distributed to multiple processors and processed in parallel. The computation engine 107 contains a detection module 108, that is adapted and configured to perform all or portions of malware detection processes, including detection of malware downloads within the network. In an embodiment, the detection module 108 generates malware detection alerts and sends them from the computation engine 107 to a display device 109, which is in communication with the detection module 108. The display device 109 may be remote from the system 10 and may also serve as an additional analysis module, where alerts are triaged by users such as network analysts. Feedback from users can also be sent back to the detection module 108 so that detection processes can be updated and improved over time.

The detection module 108 executes a series of steps at a regular frequency in order to identify suspicious downloads in the recently acquired data. The run frequency can be configured depending on the network data volume and the desires of network analysts. Each time the process, or process software, runs within the detection module 108, it identifies suspicious downloads that occurred in the time interval since the previous run. This interval is referred to as the "test interval," and the metadata written to database 106 during the test interval are referred to as the "test data." As an example, the detection module 108 could be configured to run daily. In this case, the software would identify suspicious downloads in test data collected by sensors 104 during the 24-hour test interval prior to each run.

Methods for Malware Detection

Figure 2:
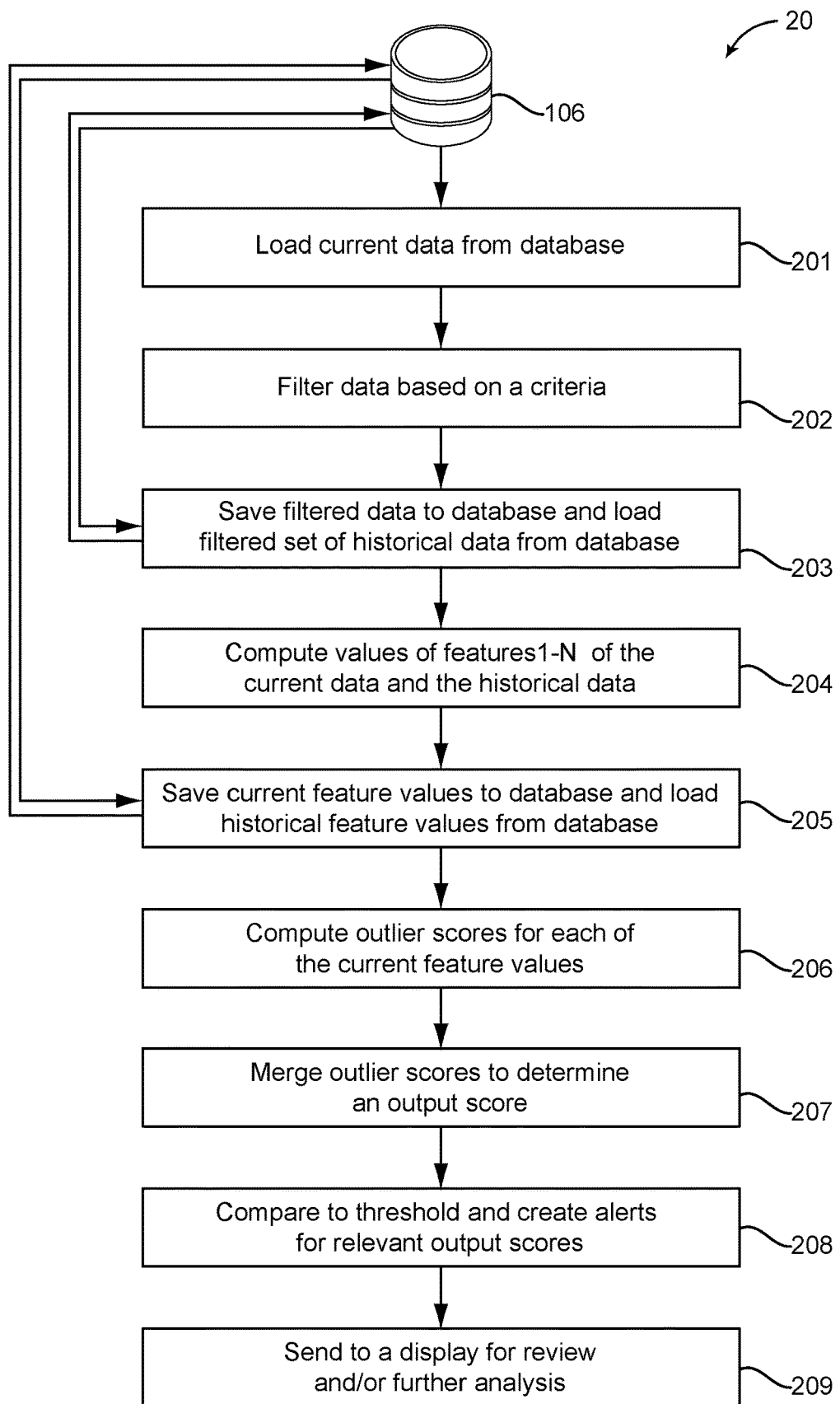
FIG. 2 is a flow diagram of an exemplary method of malware detection according to an exemplary embodiment of the present invention.

FIG. 2 is a flow diagram of an embodiment of an exemplary method 20 of malware detection. All or some of the steps of the method 20 may be performed by the detection module 108 and/or computation engine 107 of the exemplary system 10 of FIG. 1. In the first step 201, currently observed test data (i.e. current data) are loaded from the database 106. In an embodiment, the test data contains HTTP records with HTTP metadata extracted by sensors 104. The HTTP records may consist of information that includes file downloads and other information such as file uploads, HTTP POSTs, authorization requests, and other records produced by normal browsing of the internet 103. In step 202, the records are filtered based on one or more criteria. In an embodiment, the filtering step utilizes HTTP Path information, and the HTTP records are removed if they do not represent downloads (e.g., if the path is empty or does not contain a file extension). Other filters may also be employed at this step including, but not limited to file type, file size, file extension, file content, file download etc. For example, if network analysts are only interested in detecting suspicious downloads with one or more particular file extensions, then downloads of other extensions may be removed. File extensions of interest may be, for example: 7z, bat, bin, cmd, dll, dmg, doc, docm, dotm, exe, go, hta, iqy, jar, m68k, m86k, msi, pif, potm, ppam, ppsm, pptm, ps1, ps2, py, rar, scr, sh, sldm, tmp, uras, vb, vbe, vbs, ws, wsf, x86, xlam, xlsm, xltm, and zip. The output of step 202 is a table that contains just the data, e.g., file downloads of interest from the test data, which have been filtered. Herein, this group of files are referred to as "currently filtered test data". In step 203, the filtered test data is saved to the database 106, and a filtered set of historical data ("historically filtered test data") associated with previously observed test file records is loaded from the database 106.

In step 204, values of a plurality of suspiciousness features$_{1-N}$ are computed or determined for the currently filtered test data and the historically filtered test data. Suspiciousness features are properties or characteristics related to file type, file typed, domain, outdated User-Agent, outdated Content-Type that are associated with potential malware downloads etc. Features$_{1-N}$ may be designed or pre-selected by a user or analyst, and may include, for example information about how many users have accessed a particular domain, the fraction of days within a time period with SLD, a Path, a Referer, a User-Agent, the fraction of the same-extension downloads in a given period of time with the same Content-Type or similar Content-length, and other file name-related suspiciousness. In some embodiments, features$_{1-N}$ are determined based on historical network data. In sum, the features$_{1-N}$ are defined to correlate with the suspicious behavior exhibited by malware.

As noted above, a plurality of features$_{1-N}$ may be used in the detection of malware according to the embodiments herein, and the invention is not limited to a specific feature set or number of features. In an exemplary embodiment, features 1-4 are described and calculated as follows. Feature 1 is a count of the number of times downloads are made from the observed HTTP Host on the network over an interval (e.g., 30 days) preceding the test interval, multiplied by a negative one (−1) so that unpopular hosts are represented by higher values. Feature 2 is a count of the number of times the observed HTTP Path was downloaded on the network over the 30-day interval preceding the test interval, multiplied by negative one so that unpopular Paths are represented by higher values. Feature 3 is a quantitative measure of outlierness (i.e., the amount by which the feature value is abnormal with respect to a group of other feature value data points) of the observed file size relative to other file downloads with the same extension that occurred on the network over the 30-day interval preceding the test interval. This could be quantified, for example, using the "Local Outlier Factor" algorithm. Feature 4 is a quantitative measure of how strongly the downloaded file name correlates with a list of known malware file names. This is measured, for example, using a supervised machine learning model like a "Long Short-Term Memory" network.

In step 205, after the feature$_{1-N}$ values of the currently filtered test data are acquired, they are saved to the database 106. Then, a set of historical feature values, saved during previous runs, is loaded from the database 106. In an embodiment, the amount of historical feature values that are loaded in step 205 is selected and configurable based on: 1) the resources available in the computation engine 107; and/or 2) a predetermined amount selected by a user or network analyst. In an exemplary embodiment, the detection module 108 is configured with a daily test interval, and historical feature values that was saved over the seven days preceding the test interval is loaded from the database 106. In an embodiment, in which feature 1 is used, a table or list containing the counts of each Host value in the currently filtered test data is written to the database 106. Then in the second part, a selected length of time (e.g., 30 days) of the historical summary tables of the historical data from previous runs is loaded and used to compute features$_{1-N}$ for each download in the currently filtered test data. This aspect provides the advantage of computational efficiency in part because steps 201 and 202 only need to be executed once in each test interval.

Figure 3:
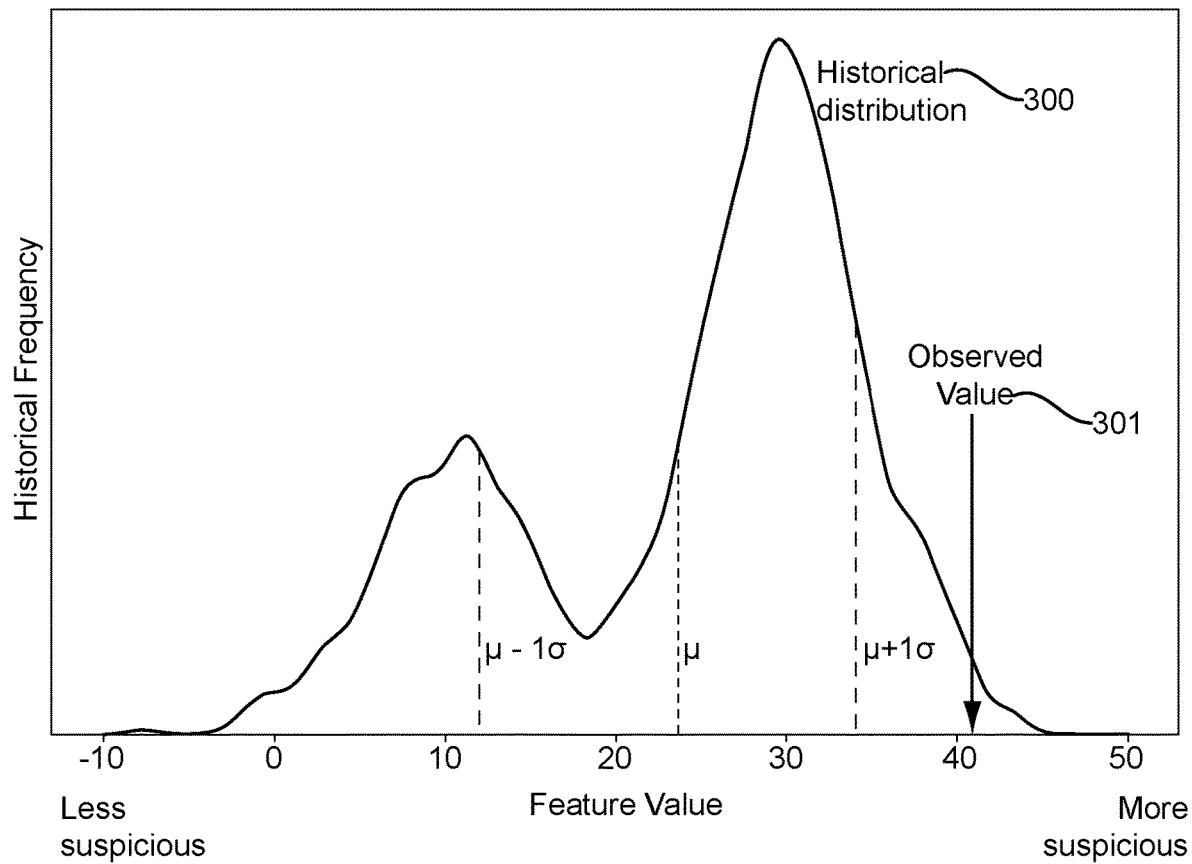
FIG. 3 illustrates how outlier scores are computed for each feature according to embodiments of the present invention.

In step 206, an algorithm such as a Z-score, P-value or similar is used to calculate an outlier score of the values features$_{1-N}$. In an embodiment, the historical feature values are used to calculate the outlier score for each feature value in the filtered test data. As illustrated in exemplary FIGS. 3 and 4, the outlier score is a Z-score. In this embodiment, the Z-score for a given observed feature value within a population of values, is a signed measure of the fractional number of standard deviations by which the observed value is above the population mean. An example Z-score calculation utilized in step 206 is illustrated in FIG. 3. The plot contains a distribution of historical feature values 300, and an arrow indicating a single observed value 301. The mean and standard deviation of the historical distribution are calculated and indicated on the plot. The Z-score of the observed value with respect to the historical distribution is found to be 1.8σ, since the observation is 1.8 standard deviations above the mean of the distribution.

Figure 4:
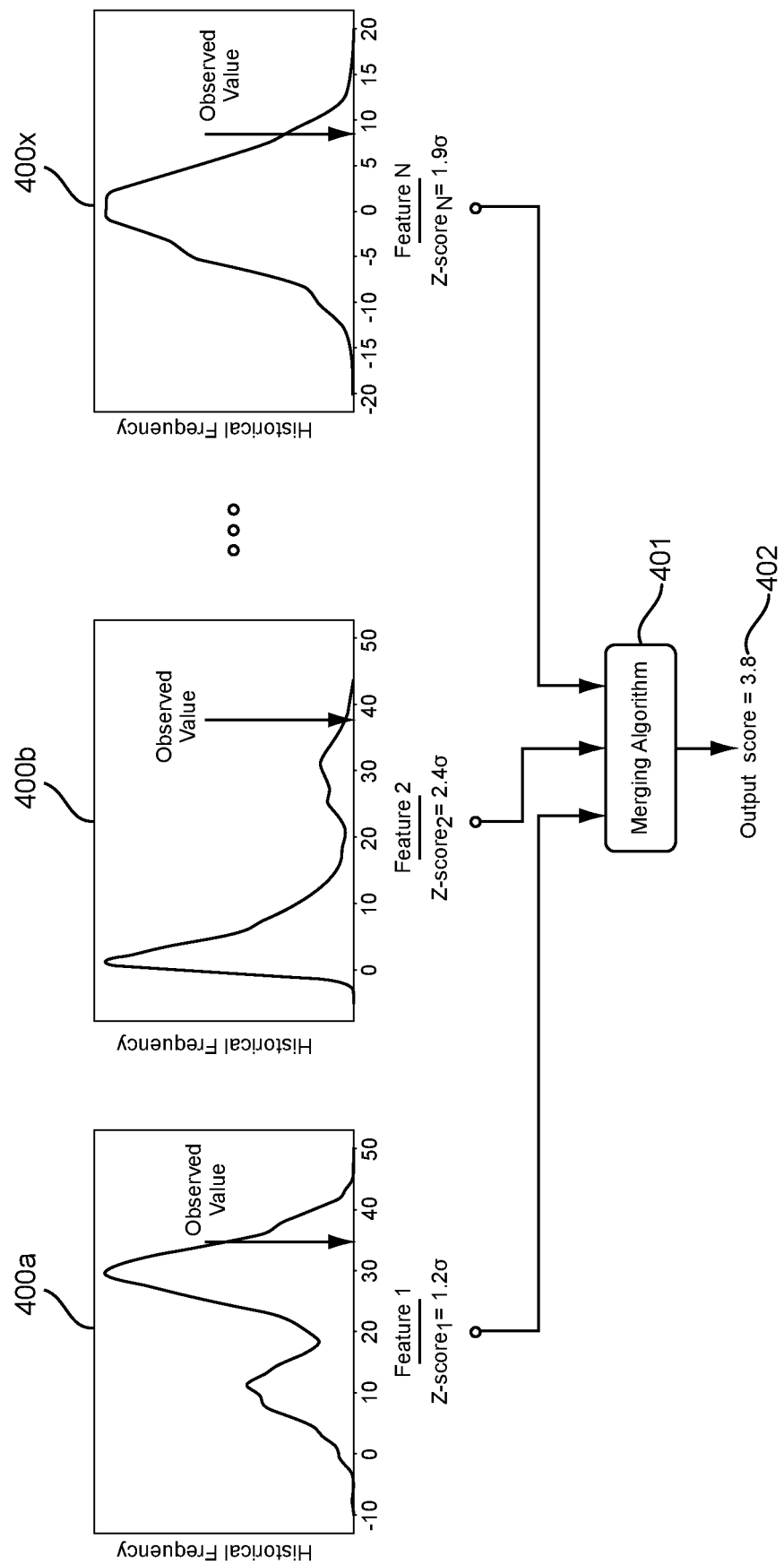
FIG. 4 illustrates how features are merged to determine an output score according to embodiments of the present invention.

After outlier scores are computed for each features$_{1-N}$ in step 206, a table or list of filtered test data with features and Z-scores is created and passed to step 207. In step 207, the Z-scores for each row of the filtered test data are merged into a single "suspiciousness score" or output score. In an embodiment, the output score indicates how suspicious or likely a file download may be of qualifying as malware. The Z-score computation, and merging steps are illustrated in FIG. 4. Example historical feature distributions and observed feature values for features$_{1-N}$ are shown in graphs 400a-x, respectively. The observed features$_{1-N}$ values yield their respective Z-scores$_{1-N}$. The individual Z-scores$_{1-N}$ for each feature are then passed to the merging step or algorithm. The merging step may include one more calculations such as a sum, weighted average, supervised machine learning model, etc. The merging step 401 combines the individual Z-scores$_{1-N}$ into an output score 402. In this example, the output score 402 has a value of 3.8.

In step 208, output scores 402 are compared to a threshold, and those below a predetermined/selected threshold are removed from the currently filtered test data. Alerts may be generated from the surviving records, i.e., file records associated with output scores 402 above the threshold, and these file records are considered or further analyzed as (e.g., suspicious downloads of) potential malware. Each alert may contain illustrations and/or data describing the suspicious indicators, behaviors, and underlying metadata for a single suspicious download. In an embodiment, illustrated in step 209, the alerts are sent from the computation engine 107 to a display device 109 where they can be reviewed and analyzed by network analysts. In an embodiment, the display device 109 has additional analytical capabilities such that a user may triage the alerts and provide feedback and/or additional algorithms via the display device 109 and then send them back to the computation engine 107 so that details of the algorithm may be adjusted accordingly.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A system for detecting malware in a network comprising:
   at least one sensor configured to:
      mirror network traffic for at least one device connected to the network;
      create a set of test data consisting of transfer protocol metadata by, for a period of time, parsing the mirrored network traffic for metadata;
   a database coupled to the at least one sensor and configured to:
      receive the set of test data from the at least one sensor;
      store a set of historical data previously obtained from the network, wherein the historical data consists of transfer protocol metadata;

and
a computation engine including at least one processor and non-transitory memory, the computation engine including a detection module configured to run on the computation engine and adapted and configured to perform the steps of:
loading the set of test data from the database;
filtering the set of test data to obtain filtered data based on at least one criterion;
saving the filtered data to the database;
determining a value of each of a plurality of features of the filtered data;
loading, for each of the plurality of features of the filtered data, a set of previously computed historical feature values from the database, wherein the historical feature values were computed from the set of historical data;
computing an outlier score for each feature value of the plurality of features of the filtered data, wherein the outlier score is computed by comparing each feature value of the filtered data to the corresponding set of historical feature values; and
merging the outlier scores to obtain an output score, wherein the output score is used to detect malware.

2. The system of claim 1, wherein the at least one criterion is one of a file path information, file name, a content type, a content length, and a file extension type.

3. The system of claim 1, wherein the step of computing an outlier score includes performing at least one of a Z-score and a p-value calculation of each of the plurality of features.

4. The system of claim 1, wherein the step of merging the outlier scores includes using one of a sum, a weighted average, and a supervised machine learning model algorithm to obtain the output score.

5. The system of claim 1, wherein the transfer protocol is one of HTTP, FTP, SMB, and SMTP.

6. The system of claim 1, wherein the detection module is further adapted and configured to perform the step of creating an alert for each of the output scores at or above a predetermined threshold.

7. The system of claim 6, further comprising a display for displaying the alert received from the detection module.

8. The system of claim 1, wherein the plurality of features includes at least one of: a count of a number of times downloads are made from an observed protocol host over a time interval, a count of a number of times an observed transfer protocol path is downloaded over a time interval, an amount by which the value of one feature within the plurality of features is abnormal relative to other file downloads with a same extension as the one feature, and a determination of how strongly a downloaded file name within the current data correlates with a list of known malware file names.

9. A method for detecting malware in a network comprising the steps of:
mirroring network traffic for at least one device connected to the network;
creating a set of test data consisting of transfer protocol metadata by, for a period of time, parsing the mirrored network traffic for metadata;
storing the set of test data and a set of historical data previously obtained from the network in a database, wherein the historical data consists of transfer protocol metadata;
loading the set of test data from the database;
filtering the set of test data to obtain filtered data based on at least one criterion;
saving the filtered data to the database;
determining a value of each of a plurality of features of the filtered data;
loading, for each of the plurality of features of the filtered data, a set of previously computed historical feature values from the database, wherein the historical feature values were computed from the set of historical data;
computing an outlier score for each feature value of the plurality of features of the filtered data, wherein the outlier score is computed by comparing each feature value of the filtered data to the corresponding set of historical feature values; and
merging the outlier scores to obtain an output score, wherein the output score is used to detect malware.

10. The method of claim 9, wherein the at least one criterion is one of a file path information, a file name, a content type, a content length, and a file extension type.

11. The method of claim 9, wherein the step of computing an outlier score includes performing at least one of a Z-score and a p-value calculation of each of the plurality of features.

12. The method of claim 9, wherein the step of merging the outlier scores includes using one of a sum, a weighted average, and a supervised machine learning model algorithm to obtain the output score.

13. The method of claim 9, wherein the transfer protocol is one of HTTP, FTP, SMB, and SMTP.

14. The method of claim 9, further comprising the step of creating an alert for each of the output scores at or above a predetermined threshold.

15. The method of claim 14, further comprising displaying the alert in a display.

16. The method of claim 14, wherein the plurality of features includes at least one of: a count of a number of times downloads are made from an observed protocol host over a time interval, a count of a number of times an observed transfer protocol path is downloaded over a time interval, an amount by which the value of one feature within the plurality of features is abnormal relative to other file downloads with a same extension, and a determination of how strongly a downloaded file name within the current data correlates with a list of known malware file names.

* * * * *